United States Patent
Wilson, Jr.

[11] Patent Number: 5,827,037
[45] Date of Patent: Oct. 27, 1998

[54] DISTRIBUTION CHASSIS

[76] Inventor: Marvin L. Wilson, Jr., 44-291B Kaneohe Bay Dr., Kaneohe, Hi. 96744

[21] Appl. No.: 703,861

[22] Filed: Aug. 27, 1996

Related U.S. Application Data

[60] Provisional application No. 60/002,990, Aug. 28, 1995.

[51] Int. Cl.$^6$ ....................................................... B60P 1/26
[52] U.S. Cl. ........................... 414/556; 414/540; 414/545; 414/557
[58] Field of Search ..................................... 414/539, 540, 414/541, 545, 546, 549, 556, 557, 558, 396, 39 L, 400, 401; 296/57.1, 61; 254/2 R, 90 C, 2 C; 187/234, 237

[56] References Cited

U.S. PATENT DOCUMENTS

| | | | |
|---|---|---|---|
| 2,921,700 | 1/1960 | Reed, Jr. | 414/545 |
| 2,949,197 | 8/1960 | Lomen et al. | 414/545 |
| 4,005,788 | 2/1977 | Ratliff | 414/557 |
| 4,580,805 | 4/1986 | Bertolini . | |
| 4,787,809 | 11/1988 | Zrostlik | 414/557 |
| 4,836,736 | 6/1989 | Neagu | 414/557 |
| 4,850,786 | 7/1989 | Oswald et al. . | |
| 4,969,659 | 11/1990 | Ehrlich . | |
| 5,092,623 | 3/1992 | Swanner . | |
| 5,118,245 | 6/1992 | Dunkel . | |
| 5,193,836 | 3/1993 | Hastings . | |

FOREIGN PATENT DOCUMENTS

| | | | |
|---|---|---|---|
| 512545 | 7/1952 | Belgium | 414/557 |
| 1636-290-A | 3/1991 | U.S.S.R. . | |
| 1389172 | 12/1991 | U.S.S.R. | 414/557 |
| 1698122-A1 | 12/1991 | U.S.S.R. . | |

OTHER PUBLICATIONS

Multilift KL700 Publication—Received Apr. 19, 1990.

*Primary Examiner*—Frank E. Werner
*Attorney, Agent, or Firm*—Martin E. Hsia

[57] ABSTRACT

A trailer chassis for receiving and transporting shipping containers having a platform extension fixedly attached to the rear end and with a liftgate that can be moved between a position level with the platform extension and ground level. The platform extension and the liftgate are each large enough for a loaded pallet handler to maneuver. This construction allows a forklift, pallet jack or other pallet handler to unload palletized cargo directly from the shipping container at various retail locations without the need for an elevated loading dock.

15 Claims, 1 Drawing Sheet

DISTRIBUTION CHASSIS

This is a continuation of provisional patent application Ser. No. 60/002,990, filed Aug. 28, 1995.

TECHNICAL FIELD

This invention relates to modifications to a trailer chassis to allow direct unloading of products at a store, restaurant or other location that is served by a warehouse (herein referred to as a "retail location") from a shipping container mounted on the chassis. This direct unloading avoids the costs and delays of conventionally unloading the products from the container, warehousing the unloaded products, reloading the products on delivery vehicles, driving the delivery vehicles to the retail location, and unloading the products from the delivery vehicles.

Products being shipped by boat are usually "palletized", that is, placed on pallets so that they can be manipulated by a forklift, pallet jack, or other pallet handling apparatus (herein collectively referred to as "pallet handlers"). The palletized products are then usually loaded in shipping containers of various conventional sizes. The containers are then shipped to their destinations.

Upon arrival at their destinations, the containers are usually offloaded from boats or ships and then mounted on trailers that are especially adapted for transporting the containers. The trailers (with the containers mounted on them) are then driven by trucks to warehouses.

Conventionally, the containers are detachably mounted on top of the chassis of the trailers and the interior floors of the containers are therefore a substantial distance above the ground when so mounted. Accordingly, warehouses and other facilities for receiving products from shipping containers must be provided with elevated loading docks so that the palletized products can be unloaded from the containers using a pallet handler. The pallet handler then can roll in and out of the container directly from the dock, which is at the same level as the interior floor of the container (when the container is mounted on the trailer).

Shipping containers often are not immediately unloaded when they arrive at a warehouse. They are often placed aside for several days until they can be scheduled for unloading at the warehouse. Thus, the products in the container are often stored in the container for several days. Needless to say, storage conditions in the container are often not optimal for the products, especially if the container is left in direct sunlight. If the container has refrigeration equipment, power and fuel must be provided to the container until it is unloaded. Further, the delay in unloading containers at the warehouse makes the loaded containers unavailable for other use, so that additional containers must be purchased or leased, at substantial cost, to replace the capacity tied up by the loaded containers awaiting unloading.

When a container is scheduled to be unloaded at a warehouse, the rear end of the container is maneuvered until it abuts against an elevated loading dock. The interior floor of the container and the floor of the loading dock are then at the same level and abutting against each other, so as to form a substantially continuous flat surface between the dock and the container floor. Pallet handlers can then be used to unload the products from the containers into the warehouse.

After the palletized goods are unloaded into the warehouse by personnel who usually perform unloading work, other personnel must assign the goods to designated areas of the warehouse, called "slots." The various types of goods must then be transported to the proper assigned slots in the warehouse. This process is called "slotting." However, the goods cannot be placed in a slot at random because the goods on the shelves in any particular slot must be "rotated" to preserve freshness. For example, newly arrived goods may be placed on the top shelf of a slot, and goods to be delivered may be "picked" from the bottom shelf of the slot. After the bottom shelf of the slot is emptied, the goods in the higher shelves will all be moved to the next lower shelf. This "rotation" is done to assure that all goods are fresh; otherwise, some goods may not be picked until the slot has been completely emptied, which may be very rarely. Of course, the warehouse must maintain the goods under good storage conditions after they have been slotted and rotated. Obviously, this rotation of goods, and the supervision to assure that goods are properly slotted and rotated, are costly.

When goods are to be delivered to retail locations, they must be "picked," that is, warehouse personnel must select the goods to be delivered for the particular retail locations, and must retrieve those goods from the appropriate slots. The picked goods then must be "routed," that is, the goods for the last destination must be loaded into the delivery vehicle first, and the goods for the first destination must be loaded into the deliver vehicle last, for example. If the goods are not routed properly, the palletized goods for the first destination will be behind other pallets (and inaccessible) when the delivery vehicle arrives at the first destination, for example.

There are two types of loading docks in common use, "open" and "closed." In an open loading dock, only an elevated dock floor is provided, so that the interior of the container (and often the interior of the warehouse) are exposed to the environment while the container is being unloaded. However, it is strongly desired, especially when dealing with food, that unloading take place at "closed" loading docks, in which the entire rear end of the container is sealed against the environment while the container is being unloaded. This normally requires that the loading dock be structured as an elevated door in a wall, so that the side walls and the ceiling of the container also abut against the loading dock when the floor of the container abuts against the loading dock. Closed loading docks normally do not have recesses to receive projections extending rearwardly from the rear ends of containers.

It is preferable that a closed loading dock also provide some kind of sealing engagement apparatus so that the entire circumference of the rear end of a container is sealingly engaged with the loading dock when the container abuts against the loading dock. Ideally, daylight should not be visible between the rear end of the container and the periphery of the closed loading dock when the container is being unloaded. The sealing engagement apparatus could be as simple as a gasket around the periphery of the door of the closed loading dock, or could also include more elaborate sealing mechanisms, such as telescoping shrouds or accordion pleated extensions. Regardless of the particular structure of the sealing engagement apparatus, it should prevent birds, rodents, insects, dust, heat, humidity and other environmental contaminants from entering into the container and the warehouse (with its stockpiled cargo from other containers) while a container is being unloaded. Thus, it is important that the rear ends of conventional shipping containers be substantially free of rearwardly extending projections so that the entire circumference of those rear ends can abut against a closed loading dock.

It is not preferred to drive a container into the interior of a warehouse for unloading because it would take too much warehouse space, and because workplace rules restrict the amount of carbon monoxide and other pollutants generated by vehicles that can be introduced into a closed work environment. Thus, containers are almost always unloaded at elevated loading docks outside a warehouse, and the palletized goods are then brought into the warehouse from the dock using pallet handlers.

Conventionally, when a retail location requires a quantity of a product, a number of pallets of the desired product are picked and routed in the warehouse and loaded onto a delivery vehicle using a pallet handler. The delivery vehicle then is driven to the retail location, where it is unloaded.

The delivery vehicle is usually provided with a liftgate, which provides a platform that is movable between ground level and the elevated interior floor of the delivery vehicle's cargo space. Conventionally, liftgates also are storable in a folded, vertical, or other compact configuration so that they are out of the way when not being used, such as when the vehicle is being driven between locations.

Individual pallets are unloaded at the retail location, usually using a pallet handler that is also carried by the delivery vehicle. The pallet handler usually picks up a pallet and then moves onto the liftgate while carrying the pallet. The liftgate then is lowered to ground level, and the pallet and pallet handler are moved off the liftgate and into the retail location. These steps are repeated until the desired number of pallets have been unloaded at the retail location.

Deliveries to retail locations cannot be made directly from containers on trailers, because retail locations normally are not provided with an elevated loading dock, so that pallets bearing the products cannot normally be unloaded from the container using a pallet handler. Containers are not usually provided with platform extensions or liftgates because they must be packed tightly for shipment by boat. Trailer chassis are not usually provided with platform extensions or liftgates either.

The requirement that pallets of products be unloaded from containers at elevated loading docks in a warehouse, slotted, properly maintained, picked, routed and then reloaded for delivery by delivery vehicles (with liftgates) to retail locations incurs substantial costs, especially in time and equipment needed to handle the products (including the delivery vehicles).

BACKGROUND ART

U.S. Pat. No. 4,969,659 to Ehrlich discloses an extendable container chassis in which first and second chassis members slide with respect to each other between a retracted position and an extendable position.

U.S. Pat. No. 4,580,805 to Bertolini discloses an extendable truck trailer chassis having a movable rear extension equipped with a gear rack whose teeth are adapted to mesh with teeth of an idler pinion mounted on the main frame, which is, in turn, in mesh with a similar gear rack on a cradle carried on the chassis.

U.S. Pat. No. 4,850,786 to Oswald, et al discloses a container handling apparatus having longitudinally extending primary frames and a cross frame that interconnects the front ends of the primary frames.

U.S. Pat. No. 5,092,623 to Swanner discloses a trailer having a frame upon which a bed slides relative to the frame and on which the bed tilts when the rearmost portion moves the center of gravity away from the wheels.

U.S. Pat. No. 5,193,836 to Hastings discloses a cargo carrying container that can extend cantileverly rearward over the rearmost attachment station to an underlying drayable chassis.

U.S. Pat. No. 5,118,245 to Dunkel discloses a transversely expandable trailer in which the rear support wheels are outside normal highway width limits when in the expanded position.

U.S.S.R. Patent 1691822-A1 to Kozl discloses a transport trailer with removable sides in which the lower tier of the base is positioned on a telescopic element and the upper tier is composed of two panels hinged at one end to opposite sides of the frame.

U.S.S.R. Patent No. 1636-290-A2 to Transtekhnika Res discloses a trailer with extendable L-shaped frames on cross beams.

The inventor is aware of an ice cream company that has installed a liftgate on the rear of a chassis for a trailer for a refrigerated shipping container. The liftgate allows the ice cream to be unloaded directly from the container, but the ice cream must be unloaded by hand or by hand truck; it cannot be unloaded using a pallet handler because there is no room to maneuver the pallet handler, and because it would not be economical to store the pallet handler inside the container, where it would take up room needed for ice cream.

It is therefore an object of this invention to provide a device that will allow direct unloading of palletized products at a retail location from a container mounted on a trailer in the absence of an elevated loading dock.

It is also an object of this invention to avoid all the costs and delays incurred by interim warehousing of palletized goods before delivery to retail locations, including costs and delays of unloading, slotting, rotating, storing, picking, routing and reloading goods at a warehouse.

It is a further object of this invention to provide such a device that is economical, compact and easily transported.

It is a still further object of this invention to provide such a device that will provide enough room for a pallet jack or other pallet handling device to maneuver adjacent to the rear end of the container in order to unload the container.

It is a still further object of this invention to provide such a device that will avoid the need to purchase or lease additional containers to compensate for containers that are awaiting unloading.

DISCLOSURE OF INVENTION

These and other objects are obtained by a chassis having a rear end, a platform extension fixedly mounted and rearwardly extending from said rear end by a platform depth, and a liftgate having a liftgate depth movable from the level of the rearward end of the platform extension and ground level. Preferably the liftgate is foldable for storage when the container is not being unloaded, and preferably conventional refrigeration apparatus is provided for the container.

This combination of a rearwardly extending platform extension and a moveable liftgate allows palletized cargo to be unloaded directly from a container at a retail location. Preferably, the platform depth is great enough that a pallet handler can maneuver outside the rearward end of the container at the same level as the interior floor of the container. Preferably the platform depth is between 2 and 5 feet, preferably between three and four feet, and optimally approximately three feet. Preferably the liftgate also is sufficiently large to accommodate both the pallet handler and a pallet being unloaded. Accordingly, preferably the liftgate has a liftgate depth of between approximately four and seven feet deep, and optimally approximately five feet deep.

The invention does not require major structural modifications to a trailer chassis and therefore can be easily retrofitted to existing chassis.

Because the container can be unloaded directly at retail locations using this chassis, the container does not have to be unloaded at a warehouse. Accordingly, the container does not have to abut against, or sealingly engage with, a closed loading dock. Thus, although the rearwardly extending platform extension would prevent the container from being unloaded at a closed loading dock, such unloading is rendered unnecessary by this chassis.

In operation, a shipping container full of palletized cargo would be mounted on the chassis and the platform extension would extend rearwardly approximately three feet from the rear end of the container. Preferably a foldable liftgate with a liftgate depth of approximately 5 feet would be provided. Optimally, the liftgate would be foldable and storable extending vertically upwards from the rear end of the platform extension, or underneath the platform extension. A pallet handler preferably would be retained on the platform extension during transportation of the container.

The container full of palletized cargo, with a pallet handler on the platform extension, would be driven to a retail location. The rear end of the container then would be opened and the liftgate would be unfolded to its operational configuration and raised to a position abutting against the rear end of the platform extension and coplanar with the platform extension. The pallet handler then would maneuver on the platform extension (and the liftgate, if necessary) to remove any desired pallet from the rear end of the container. The pallet handler carrying the pallet would be maneuvered onto the liftgate. The liftgate then would be lowered to the ground and the pallet handler could then maneuver the pallet and deliver it to the appropriate area at the retail location. After depositing the pallet, the pallet handler then could be moved onto the liftgate, and the liftgate would then be raised to the level of the platform extension again. The process can be repeated as often as necessary to unload the desired quantity of pallets at the retail location. After the unloading process is completed, the pallet handler would be secured to the platform extension and the liftgate would be moved to the stored configuration. The container and chassis then would be driven to the next retail location at which the unloading operation would be repeated. In this manner, palletized cargo can be directly unloaded from a shipping container at various retail locations. This would avoid the cost and labor involved in unloading the container at an elevated loading dock at a warehouse, storing the palletized cargo at the warehouse, loading the palletized cargo from the warehouse into delivery vehicles, driving the delivery vehicles to retail locations, and then unloading the palletized cargo from the delivery vehicles. Because the unloading, warehousing, reloading and delivery steps can be eliminated, the palletized cargo spends less time in transit and can be delivered to customers in less time, for fresher products. Further, especially for fragile or perishable products, the cargo can remain in a refrigerated or otherwise suitable environment in the container until the cargo is delivered directly to a retail location.

The invention was disclosed in Disclosure Document 343927 filed on Dec. 3, 1993, under the title "Shortcut Chassis", which is hereby incorporated herein by reference.

Other objects, features and advantages of the present invention will become more fully apparent from the following detailed description of the presently preferred embodiment for carrying out the invention and the accompanying drawings.

BEST MODE FOR CARRYING OUT INVENTION

Figure 1:
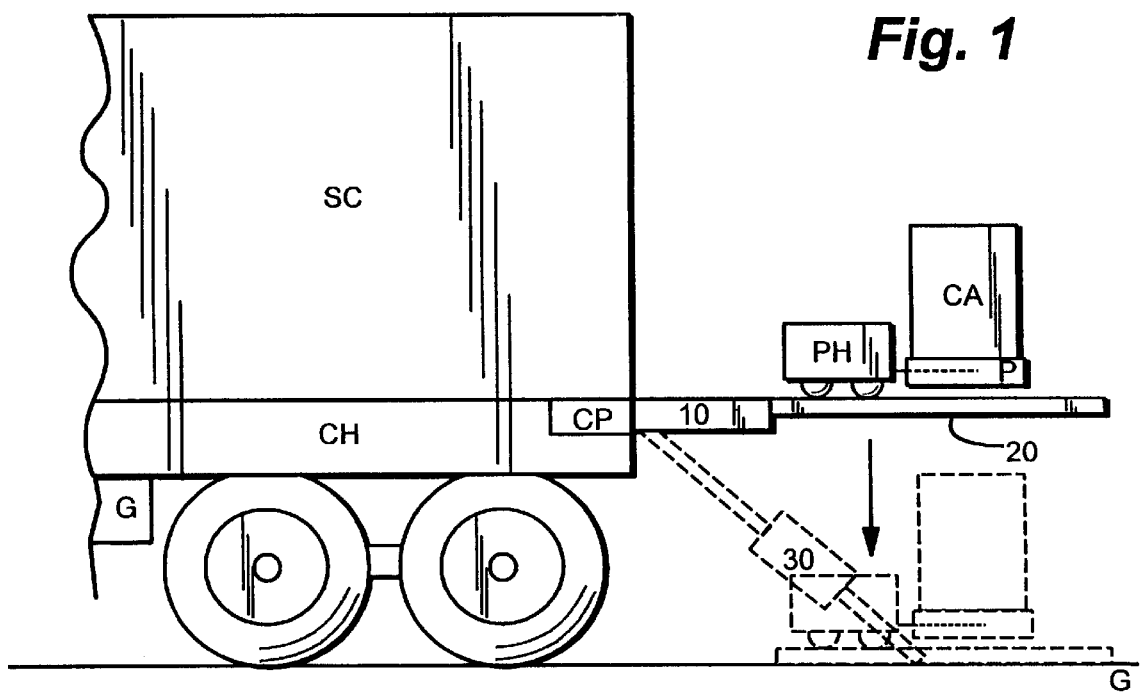
FIG. 1 is a side elevational view of a trailer chassis provided with a platform extension and a preferred folding liftgate according to the present invention, showing the liftgate in the unfolded and raised position and, in dotted line, the position of the liftgate when it is lowered.
Figure 2:
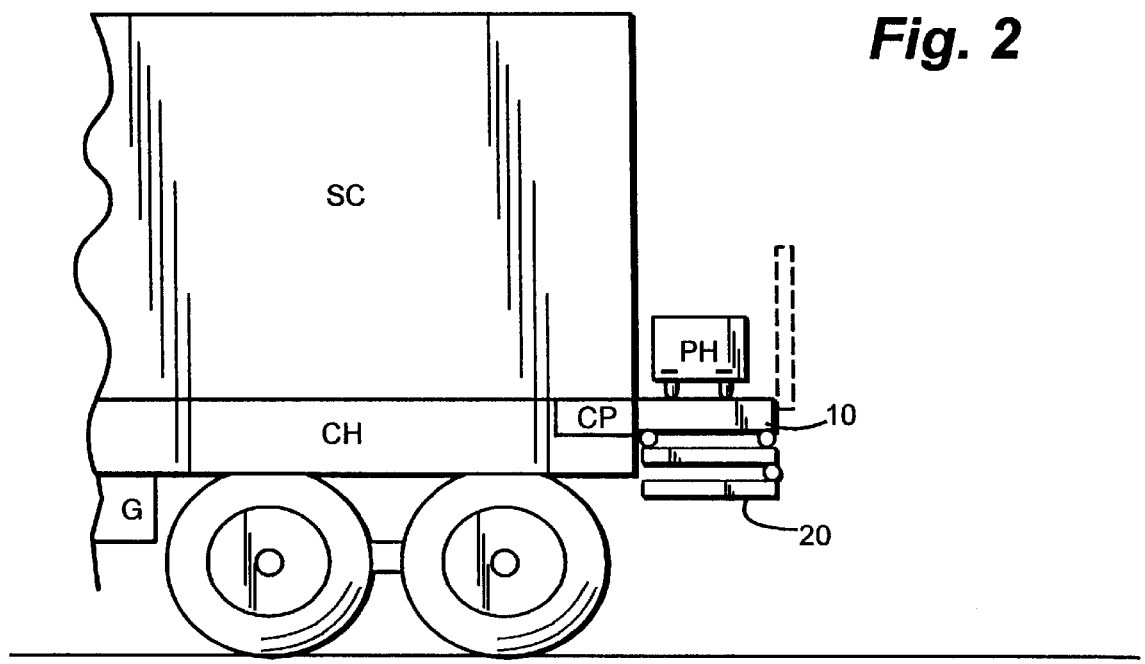
FIG. 2 is a side elevational view of the embodiment of FIG. 1, in which the preferred folding liftgate has been retracted into the stored position for storage and the pallet jack has been secured to the platform extension for transportation. An alternative vertically storable liftgate is shown in dotted line.

The best mode presently contemplated for carrying out the present invention is the preferred embodiment illustrated by way of example in FIGS. 1 and 2.

Referring to FIG. 1, shown is a conventional chassis ("CH") on which a conventional shipping container ("SC") has been mounted. A platform extension 10 has been fixedly attached to the rearward end of the chassis CH so that it extends rearwardly from the rearmost end of the chassis CH, substantially level with the interior floor of the shipping container SC. Preferably, the platform extension 10 extends approximately three feet rearwardly from the rear end of the shipping container SC.

A foldable liftgate 20 is preferably provided that, in the unfolded configuration, extends rearwardly from, and abuts against, the rearmost edge of the platform extension 10. Preferably the liftgate 20, when in the unfolded configuration, can be moved between the level of the platform extension 10, or can be lowered to the level of the ground, as shown in dotted line. Preferably a conventional lifting apparatus 30 is provided to lift and lower the liftgate 20 from the lowered position at ground level to the raised position, at the level of the platform extension 10. Preferably the lifting apparatus 30 has a lifting capacity of approximately 2,000 pounds. Preferably the liftgate 20 in the unfolded configuration extends rearwardly approximately eight feet from the rear most edge of the platform extension. Preferably the platform extension 10 is approximately rectangular in shape, with a platform extension width approximately equal to the width of the chassis CH and shipping container SC, and a platform extension depth of approximately three feet. Preferably the liftgate 20 in the unfolded configuration also is rectangular in shape with a liftgate width approximately equal to the platform extension width and a liftgate depth of approximately eight feet. The combination of a platform extension 10 and an approximately coplanar liftgate 20 (when unfolded and raised) provides sufficient room for a pallet jack or other pallet handler PH to maneuver in relation to the rear of the shipping container SC. Indeed the platform extension 10 and the raised, unfolded liftgate 20 combine to perform the function of an elevated loading dock so that the pallet handler PH can maneuver in order to retrieve palletized cargo CA in the shipping container SC. After the pallet handler PH has been maneuvered to pick up the pallet P and the cargo CA on the pallet P, the pallet handler PH can be maneuvered so that it and the palletized cargo CA are only on the liftgate 20. The liftgate 20 then can be lowered by the conventional lowering apparatus 30 so that the pallet handler PH and palletized cargo CA are at ground level. The pallet handler PH and palletized cargo CA can then be moved into a retail location. After depositing a pallet P of palletized cargo CA, the pallet handler PH can be maneuvered onto the lowered liftgate 20, which then can be raised until it approximately level with the platform extension 10. The pallet jack PH can then retrieve a second load of palletized cargo CA and repeat the process until any desired amount of palletized cargo CA has been unloaded from the shipping container SC into the retail location.

Referring to FIG. 2, shown as the embodiment of FIG. 1, but with the liftgate 20 in the folded configuration, preferably stowed underneath the platform extension 10. As can be seen, the pallet jack PH can be parked on the platform extension 10 so that it can be transported to the next retail location, without using valuable space inside the shipping SC. The platform extension 10, fold away liftgate 20 and pallet jack PH form a very compact configuration on the rear end of the chassis CH and therefore should not significantly impair the driving characteristics of the chassis CH. Further, because the platform extension 10, liftgate 20 and lifting apparatus 30 only need to be attached to end of the chassis CH, they can be retrofitted onto existing chassis CH.

If pallets are stacked on top of each other inside the container, the pallet handler PH can unload a stack of pallets and the entire stack can be delivered to the retail location. If the retail location does not need all the pallets in the stack, the cargo in the pallets on the top of the stack can be removed and the pallets on the bottom can be reloaded into the container SC.

The present invention offers many advantages over conventional container unloading, warehousing and distribution systems. By eliminating the need for an intermediate warehousing step, goods can be delivered more quickly and cheaply to retail locations for fresher products and longer shelf life. Also, the cost of goods can be reduced because of savings from reducing the amount of warehousing space that is necessary. For goods that require refrigeration or other specialized storage requirements, the present invention avoids the need for refrigerated (or other specialized) warehouse storage. Moreover, because warehousing can be virtually eliminated, the handling costs for palletized goods can be greatly reduced. There is also a quicker turnaround of container usage so that shippers do not need to invest more money for additional containers.

It is preferred that this invention be practiced with a Strick or Berwick 40-foot tandem axle chassis CH. It is also preferred that the chassis CH also be provided with 6 Schulz twist blocks to accept containers of varying lengths, such as 50-foot, 40-foot, 24-foot, and 20-foot containers. Optionally, a control panel CP can be provided adjacent to the platform extension 10 and operatively connected to the lifting apparatus 30 and the refrigeration or other environmental control mechanisms for the shipping container.

It is preferred that the lifting apparatus 30 be electrically powered. The presently preferred lifting apparatus and liftgate is a Maxon hydraulically operated foldable liftgate, but any suitable conventional liftgate can be used in the practice of the present invention.

It is preferred that a generator G be provided on the chassis CH in order to provide power to operate the liftgate. Conventionally, a petroleum burning internal combustion engine operatively connected to an electric generator is available as a single power unit for attachment to a trailer chassis, usually slung underneath the middle of the chassis, between the front and rear axles of the chassis. This unit is commonly used to provide power for refrigeration in containers that must remain refrigerated while being transported on a trailer. This power unit also can be used to provide power for a liftgate. However, no particular configuration or type of power unit is presently preferred.

The present invention can be used in connection with any business that requires delivery of goods that have been shipped in a container. The present invention has particular utility when applied to chain stores or other customers requiring delivery to multiple locations of limited types of items, but large volumes of those particular types, such as fast-food stores. In these types of businesses, a container can hold larger quantities of fewer types of goods so that the container can be completely unloaded by visiting fewer customer locations. Indeed, this may allow such a business to completely avoid warehouse storage.

While the invention has been disclosed with respect to the particular preferred embodiments described herein, it will be apparent to a person skilled in the art that there are other embodiments that fall within the spirit and scope of the invention. For example, and not by way of limitation, the liftgate could be non-foldable, but storable in a vertical position (as shown in dotted line in FIG. 2), which offers the added advantage that the stored liftgate helps to retain the pallet handler PH on the platform extension 10. Accordingly, no limitations to the present invention are to be implied or inferred, except as explicitly and specifically set forth in the attached claims.

What is claimed is:

1. A device, comprising:
    a chassis having a rear end, said chassis being adapted for receiving a detachable shipping container with an interior floor and also having walls and ceiling, whereby the interior floor of a container mounted on said chassis is elevated to a container floor height;
    a platform extension extending rearwardly from said rear end by a platform depth and defining a platform height, wherein said platform height is approximately equal to said container floor height;
    a moveable liftgate having a liftgate depth movable from a raised position abutting against and coplanar with said platform extension and a lowered position at ground level; and
    a lifting apparatus operatively connected to said liftgate whereby said liftage can be lowered to said lowered position and raised to said raised position;
    wherein said platform depth is between approximately 2 feet and approximately 5 feet, whereby said platform depth is great enough that a pallet handler can maneuver outside said container on said platform extension and said liftgate; and
    wherein said liftgate depth is between approximately 4 feet and approximately 7 feet, whereby said liftgate death is great enough for said liftgate to accommodate said pallet handler carrying a pallet.

2. A device according to claim 1, wherein said liftgate is pivotably mounted so as to be storable extending vertically upwards from said platform extension.

3. A device according to claim 1, wherein said liftgate is foldable and pivotably mounted so as to be storable underneath said platform extension when folded.

4. A device according to claim 1, wherein said liftgate is capable of lifting approximately 2000 pounds.

5. A device according to claim 1, further comprising:
    a generator mounted on said chassis adapted to provide power to said liftgate.

6. A device according to claim 1, further comprising:
    a control panel adjacent to said platform extension operatively connected to said liftgate.

7. A device according to claim 1, wherein said liftgate is mounted on said platform extension.

8. A device according to claim 1, further comprising:
    a generator mounted on said chassis adapted to be operably connected to said container to provide power for environmental control mechanisms for said container.

9. A device, comprising:

a platform extension attachable to a rear portion of a chassis, said chassis being adapted for receiving a detachable shipping container having an interior floor and also having walls and a ceiling, whereby the interior floor of said container is maintained at a container floor height when said container is mounted on said chassis, wherein said platform extension extends rearwardly from said rear portion by a platform depth and defines a platform height, wherein said platform height is approximately equal to said container floor height;

a moveable liftgate having a liftgate depth mounted on said chassis and movable from a raised position abutting against and coplanar with said platform extension and a lowered position at ground level; and a lifting apparatus operatively connected to said liftgate whereby said liftgate can be lowered to said lowered position and raised to said raised position;

wherein said platform depth is between approximately 2 feet and approximately 5 feet, whereby said platform depth is great enough that a pallet handler can maneuver on said platform and said liftgate outside said container; and wherein said liftgate depth is between aproximately 4 feet and approximately 7 feet, whereby said liftgate depth is great enough for said liftgate to accommodate said pallet handler carrying a pallet.

10. A device according to claim 9, wherein said liftgate is pivotably mounted so as to be storable extending vertically upwards from said rearward edge of said platform extension.

11. A device according to claim 9, wherein said liftgate is foldable and pivotably mounted so as to be storable underneath said platform extension when folded.

12. A device according to claim 9, wherein said platform depth is approximately 3½ feet.

13. A device according to claim 9, wherein said liftgate has a liftgate depth of approximately 5 feet.

14. A device according to claim 9, wherein said liftgate is capable of lifting approximately 2000 pounds.

15. A device according to claim 9, wherein said liftgate is attached to said platform extension.

* * * * *